United States Patent [19]

Kemper et al.

[11] 4,178,812

[45] Dec. 18, 1979

[54] VARIABLE SPEED TRANSMISSION DEVICE

[75] Inventors: Yves J. Kemper, Birmingham, Mich.; Lucien Bigot, Nantes, France

[73] Assignee: Vadetec Corporation, Troy, Mich.

[21] Appl. No.: 898,980

[22] Filed: Apr. 21, 1978

Related U.S. Application Data

[62] Division of Ser. No. 738,472, Nov. 3, 1976, Pat. No. 4,112,779.

[51] Int. Cl.² ............................................. F16H 3/02
[52] U.S. Cl. ................................................. 74/745
[58] Field of Search ............... 74/745, 690, 190, 191, 74/193

[56] References Cited

U.S. PATENT DOCUMENTS

| | | | |
|---|---|---|---|
| 2,621,545 | 12/1952 | Karig | 74/745 |
| 2,721,483 | 10/1955 | Hacker | 74/191 |
| 2,764,029 | 9/1956 | Pernollet et al. | 74/193 |
| 3,354,749 | 11/1967 | Sadier | 74/745 |

FOREIGN PATENT DOCUMENTS

172830 12/1967 Fed. Rep. of Germany ............ 74/191

*Primary Examiner*—Lance Chandler

*Attorney, Agent, or Firm*—Lane, Aitken & Ziems

[57] ABSTRACT

A variable speed transmission device of the type in which a first rotatable element is in rolling friction engagement with a second nutatable element having an axis movable in a biconical path about the axis of the first elements. The first element supports a pair of axially movable cone-like members fixed for rotation with the first element and each having exterior surfaces of revolution defined by a curved generatrix to be convex in axial section and converging away from the point of first and second element axes intersection. The rolling friction surfaces of the second element are defined by an interior cyclindrical surfaces and means are provided for adjusting the angle of the second element axis with respect to the first to vary the radii at the point of frictional contact on the cone-like members. Angular adjustment of the second element axis with respect to the axis of the first element is effected by an eccentric sleeve-like member carrying the second element in a support member rotatable about the axis of the first element. Input torque is preferably provided by a clutch to the support member whereas the variable speed output is desirably transmitted through a multi-speed gear transmission.

3 Claims, 8 Drawing Figures

VARIABLE SPEED TRANSMISSION DEVICE

This is a division of application Ser. No. 738,472, filed Nov. 3, 1976 now U.S. Pat. No. 4,112,779.

BACKGROUND OF THE INVENTION

This invention relates to improvements in variable speed transmission devices and more particularly, it concerns an improved transmission of the type in which torque is transmitted by rolling frictional engagement at two points of contact between a pair of first and second elements having surfaces of revolution angularly disposed on intersecting first and second axes, the first element being rotatable on the first axis whereas the second element nutates so that the second axis revolves in a bi-conical path about the first axis.

In a co-pending application for U.S. Pat. Ser. No. 706,291, filed July 19, 1976 by Yves Jean Kemper, there are disclosed several embodiments of a transmission in which a gyroscopic force couple is deployed at two points of rolling friction contact between a first element rotatable on its own axis and a second element having an axis revolvable about the first axis in a bi-conical path such that the second element undergoes nutational movement with respect to the first. In certain embodiments, the gyroscopic force couple is deployed to develop the normal force necessary to retain the rolling surfaces of the respective first and second elements in frictional engagement with each other whereas in other embodiments, the normal force required for frictional engagement is developed by mechanical means opposed by the gyroscopic force to minimize the load-supporting requirements of bearings used in the transmission. While both forms of the transmission, as thus characterized, have demonstrated great potential from the standpoint of providing an exceedingly well-balanced, variable speed torque transmission requiring a small number of easily machined components, the latter form in which the gyroscopic force couple opposes a mechanically induced normal friction force couple has shown particular promise because of the facility it provides for reducing both size and friction losses in bearings used to support the respective first and second elements.

Variation in angular velocity between an input shaft and an output shaft of such a transmission is effected by providing the rolling friction surfaces coupled to one of the shafts on a pair of generally conical members each having an apex half-angle approximately the same as the angle between the intersecting axes of the first and second elements. The conical surfaces converge from the point of first and second element axes intersection and are movable in the direction of convergence into engagement with annular rings carried by the second elements. The rings also are axially adjustable on the second element so as to engage the conical members at varying radial distances from the axis of the conical members. Inasmuch as the annular rings are of a fixed radius, the speed ratio of input and output shafts connected to the respective first and second elements will vary with the radius of the conical members at the point of rolling friction engagement.

Although various control devices are disclosed in the aforementioned co-pending application for controlling the axial positioning of the annular rings carried by one or the other of the first and second elements, the annular rings as well as the control mechanism for their axial adjustment represent an added number of components in the overall basically simple transmission. Accordingly, there is room for improvement particularly from the standpoint of reducing components necessary to the attainment of the variable transmission speed ratios.

SUMMARY OF THE PRESENT INVENTION

In accordance with the present invention, a transmission device is again provided in which frame supported drive input and output members are interconnected by means including a first element having a first axis fixed relative to the supporting frame, a second element having a second axis intersecting the first axis at a point of axes intersection, support means rotatable on the first axis and rotatably supporting the second element for conical movement about the point of axes intersection and circumferentially of the first axis, the first element having a pair of rolling surfaces disposed about the first axis one to each side of the point of axes intersection and the second element also having rolling surfaces to engage those on the first at two points of rolling frictional engagement. In this instance, however, eccentric means is provided for adjusting the angle of intersection between the first and second axes to shift the two points of rolling frictional engagement in opposite axial directions.

The rolling surfaces on one of the elements are established by an interior cylindrical surface positioned about a pair of cone-like members supported for rotation as the other of the elements and for axial movement toward and away from the point of axes intersection, each of the cone-like members having exterior surfaces of revolution converging from the point of axes intersection and defined by a curved, preferably circular generatrix. To enable both of the elements to be supported by simple radial bearings such that both elements are directly or positively supported on their respective axes in relation to the transmission frame, the radii of generatrix curvature are defined by lines perpendicular to tangents intersecting at an angle equal to the difference between the maximum and minimum angle of first and second axes intersection, the distance between the intersection of the radii defining lines with the tangents being approximately equal to the axial length of each convergent member plus the distance through which each such cone-like converging member is axially adjustable.

Preferably, the angle of axes intersection is adjusted by an eccentric sleeve supporting the second element from the support member. Variation in the angle of axes intersection is accomplished by a fluid control system capable of angularly adjusting the respective positions of the eccentric sleeve and the support member by an externally controlled, transmission carried pump.

For a given input speed, the rotational speed of the transmission output, preferably an output shaft, may be varied continuously through the range of radii defined by the rolling surfaces on the cone-like members. Additionally, a gear-type transmission is connected to the cone-like members to provide multiple increments of such continuously variable speed ranges as well as to reverse the direction of output shaft rotation. Also, the transmission may be releasably coupled to a source of input torque by a clutch.

Among the objects of the present invention are therefore: the provision of an improved torque transmission device of the type referred to; provision of such a transmission in which a variation in transmission speed ratio is effected by variation in the angle of axes intersection between a rotatable element and a nutating element in frictional engagement with each other at two points of contact spaced equally from the point of axes intersection; the provision of such a transmission device in which the number of component parts required before effective speed ratio variation is minimized; the provision of such a transmission device which facilitates the use of easily machined parts; the provision of such a transmission device in which all components are positively supported and controlled without need for complex supporting or control components; the provision of such a transmission which may be easily coupled to a source of input torque by a releasable clutch; and the provision of such a transmission having an incremental output speed variation superimposed on the continuous speed ratio variation effected by changing the aforementioned angle of axes intersection.

Other objects and further scope of applicability of the present invention will become apparent from the detailed description to follow taken in conjunction with the accompanying drawings in which like reference numerals designate like parts.

DETAILED DESCRIPTION OF PREFERRED EMBODIMENTS

Figure 1:
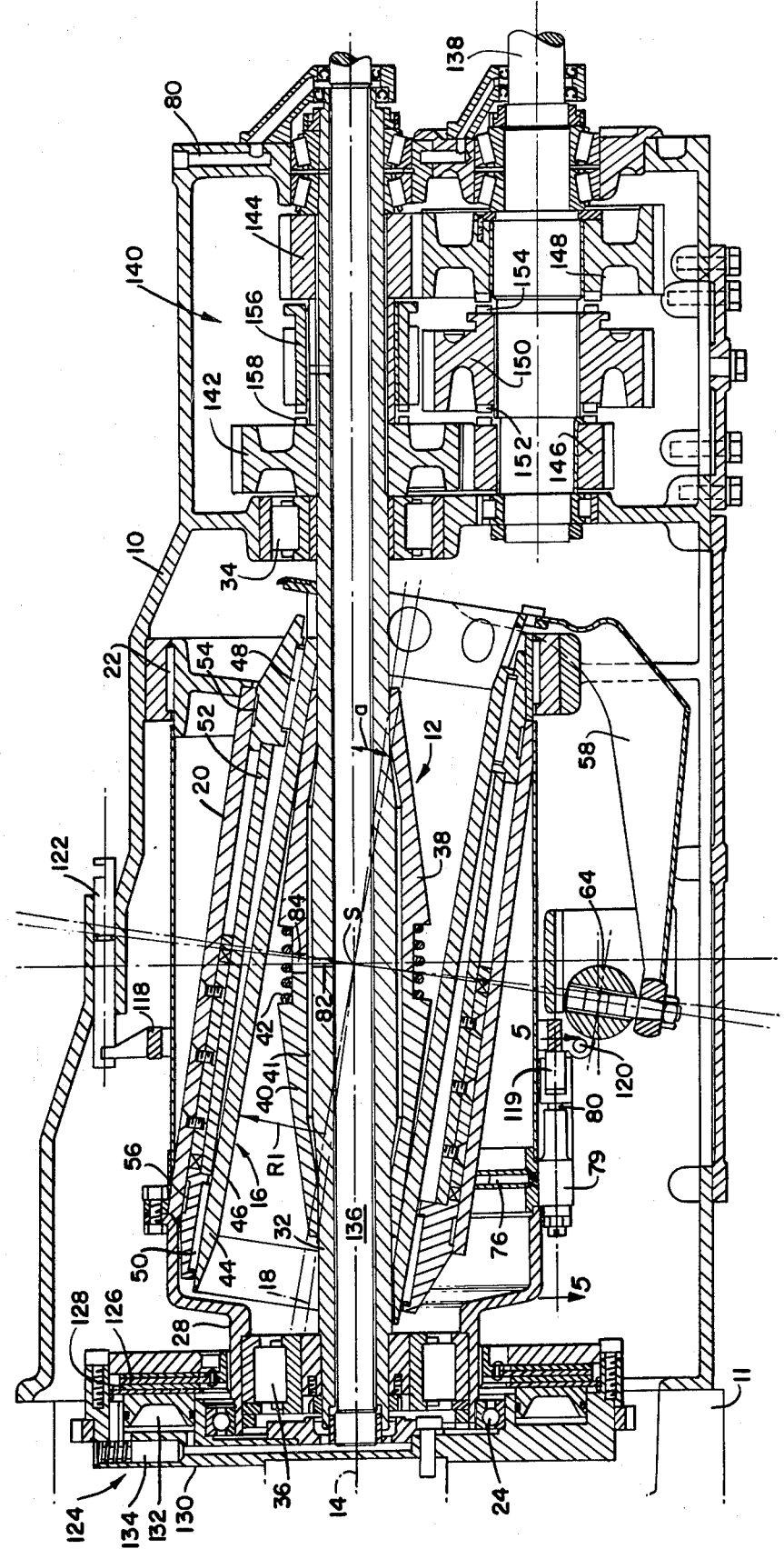
FIG. 1 is a longitudinal cross-section through the improved transmission of the present invention.
Figure 2:
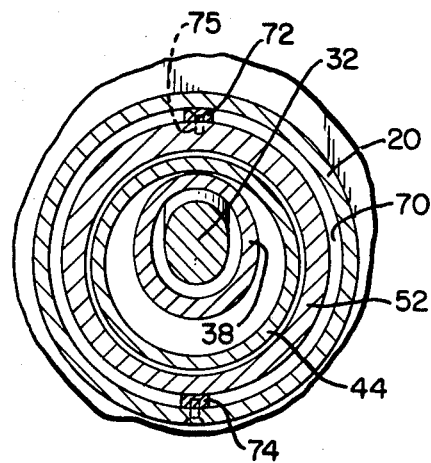
FIG. 2 is a cross-section taken on line 2—2 of FIG. 1.

In FIGS. 1 and 2 of the drawings, a preferred embodiment of the transmission in accordance with the present invention is shown to include a frame 10 supporting a first element, generally designated by the reference numeral 12, for rotation on a longitudinal axis 14. A second element 16 having symmetry about a longitudinal axis 18 is supported from the frame 10 by a support 20 journalled for rotation about the axis 14 by bearings 22 and 24. As shown, the support includes an external cylindrical shell 26 and one end of the support extends integrally as a sleeve portion 28 to be supported by the bearings 24 and to extend beyond the frame 10 for connection (via a clutch mechanism to be described) to an input shaft 30. It will be noted that although the bearings 24 are not directly supported by the transmission frame 10, the frame 10 in use will be rigidly associated with an engine frame 11 by which such support for the bearings 24 will be provided.

It will be noted that the axes 14 and 18 which, in context, may be considered as first and second axes, respectively, intersect each other at a point of axes intersection S and at an angle a. As will be apparent from the description to follow below, the point of axes intersection S will remain fixed with respect to the frame 10 and will constitute a primary reference point from the standpoint of an understandable definition of both structure and operation of the transmission embodiment disclosed. The angle a, though variable in a manner to be described hereinafter, as well as the axes 14 and 18, are also important to a complete understanding of the invention.

The first element 12 includes a hollow shaft 32 supported from the frame 10 by bearings 34 and 36 for rotation on the first axis 14. The shaft 32, in turn, supports a pair of cone-like members 38 and 40 which are fixed for rotation with the shaft 32 by splines 41 but movable axially thereon in symmetry toward and away from the point S under an axial force applied by a helical compression spring 42. While the magnitude of the mechanical force developed by the helical spring 42 will be essentially constant, other means for developing a variable axial force are contemplated, such as a fluid system or a system of helical ramps and the like.

The second element 16, in the disclosed embodiment, is an essentially cylindrical member 44 having a cylindrical interior surface 46 of constant radius R1 on the axis 18 throughout its length. The member 44 is supported for rotation by bearings 48 and 50 with respect to an eccentric sleeve 52 in turn supported by bearings 54 and 56 providing rotation with respect to the support member 20. Although embodiments of the invention are contemplated in which the cylindrical member 44 constituting the second element 16 may be freely rotatable about the axis 18 and relative to the frame 10, in the disclosed embodiment, the cylindrical member 44 is retained against rotation on the axis 18 with respect to the frame 10 by an arm 58 having one end 60 non-rotatably fixed to the cylindrical member 44 and its other end 62 secured against rotation with respect to the frame 10 by an Oldham joint 64.

As described in the aforementioned co-pending application Ser. No. 706,291, the embodiment of the transmission illustrated in FIGS. 1 and 2 will transmit input torque at the sleeve 28, for example, to rotation of the support 20 causing the cylindrical member 44 to undergo nutational movement such that the axis 18 thereof will revolve in a biconical path about the axis 14 with no relative movement of axes at the point S. The interior cylindrical surface 46 of the member 44 establishes a pair of rolling surfaces on opposite sides of the point S engagable with the cone-like members 38 and 40 at two points of contact P1 and P2 to drive the cone-like members 38 and 40 as well as the shaft 32 rotatably on the axis 14. The relative axial velocities of the shafts 30 and 32 or speed ratio of the transmission will be determined by the radius R2 of the cone-like members 38 and 40 at the points P1 and P2 in accordance with the formula, $W - Wa - Wb^{*}(R1/R2) = 0$; in which W is the rotational velocity of the shaft 32 for a given angular velocity of the shaft 30; Wa is the angular velocity of the second axis 18 about the first axis 14; Wb* is the angular velocity of the second element 16 about the second axis 18 in a frame of reference which is linked to the rotating plane containing the first and second axes 14 and 18; R1 is the radius of the second element 16 and R2 is the radius of the first element or cone-like members 38 and 40 at the point of rolling friction contact P1 and P2. In the disclosed embodiment, because the second element 16 is held against rotation on the axis 18 by the arm 58 Wb* is equal to a negative Wa or a directional reversal of Wa.

Figure 3:
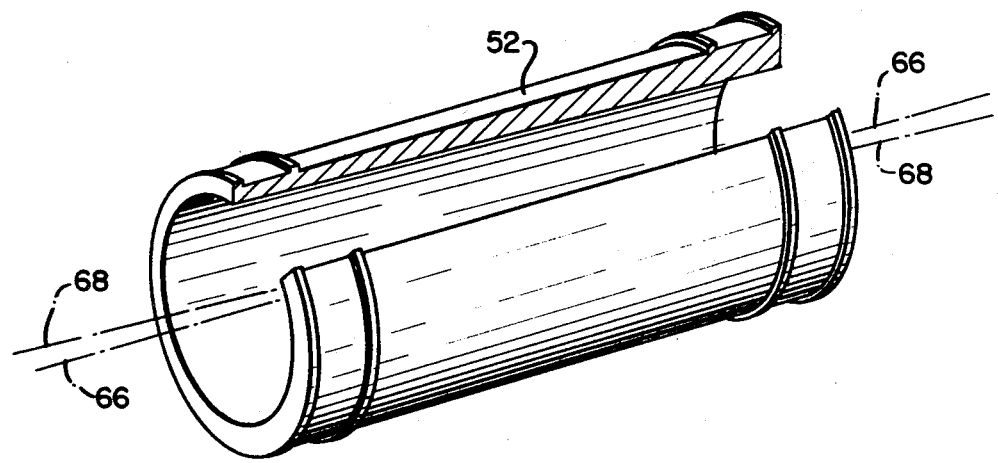
FIG. 3 is an enlarged cutaway perspective view illustrating the eccentric control sleeve of the transmission showin in FIG. 1.

As may be seen by reference to FIGS. 1 and 3 of the drawings, the eccentric sleeve 52 is shaped such that an external cylindrical journal defined by the bearings 54 and 56 is concentric with an axis 66 whereas the inner cylindrical journal of the sleeve, defined by the bearings 48 and 50, is concentric with an axis 68. While the angular relationship of the axes 66 and 68 may vary from the angle a, the axes 66 and 68 intersect each other in the assembled transmission at the point of axes intersection S. As a result of this construction of the sleeve 52 and its position between the support member 20 and the cylinder 44, relative rotation of the sleeve 52 and the support 20 will operate to vary the angle a between the first and second axes 14 and 18. To control this variation in the angle a, the exterior surface of the sleeve 52 defines with the interior surface of the support member 20 an annular chamber 70 spanned by a pair of vane-like strips 72 and 74. As shown in FIGS. 1 and 2, the vane 72 is secured by suitable means such as screws 75 to the eccentric sleeve 52 whereas the vane-like strip 74 is similarly secured to the support 20.

Due to the transmission of drive torque between the support 20 and the cylinder 44 across the chamber 70, relative rotation of the eccentric sleeve and the support will be under a drive torque bias in one direction. Such a drive torque bias will be opposed by control fluid pressure in the chamber 70 acting to effect relative rotation of the sleeve 52 and the support 20 in the other direction. Control fluid under pressure is fed to the annular chamber and discharged therefrom through a passageway 76 operatively connected to a pump 79 mounted to the exterior of the support 20.

The construction of the pump as well as the manner in which it is operated to control the flow of fluid to and from the annular chamber 70 may be understood to reference to FIGS. 1 and 4–6 of the drawings. In FIG. 1, an oil inlet port 80 is shown to be provided in the housing 10 so that oil may be fed from an appropriate source (not shown) along the interior of the hollow shaft 32 and outwardly through aligned radial ports 82 and 84 formed respectively in the shaft 32 and between the inner ends of the conical members 38 and 40. The oil will collect by centrifugal force as a layer about the inside of the shell 26 of the support 20 to provide a sump-like supply for the pump 79.

Figure 4:
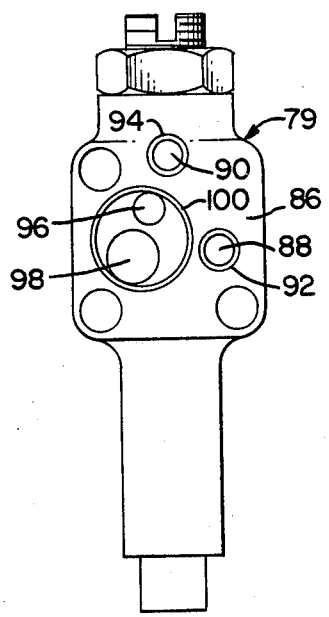
FIG. 4 is a plan view illustrating a control pump employed in the transmission of the invention.

As shown in FIG. 4, the pump 79 is formed with a mounting face 86 having port openings 88 and 90 circumscribed by O-ring seals 92 and 94 respectively, and port openings 96 and 98 circumscribed by a common O-ring 100. The face 86 of the pump 89 is secured against the support 20 such that the O-ring 100 isolates fluid communication of the passageway 76 with both of the ports 96 and 98. The ports 90 and 92, on the other hand, communicate with holes (not shown) extending to the oil sump at the interior of the support 20.

Figure 5:
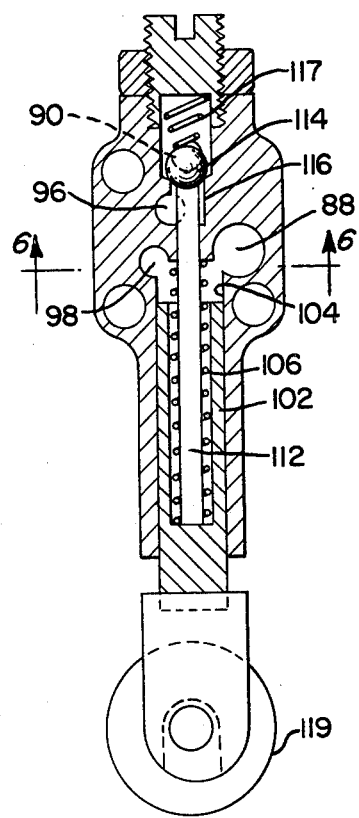
FIG. 5 is a cross-section on line 5—5 of FIG. 1.
Figure 6:
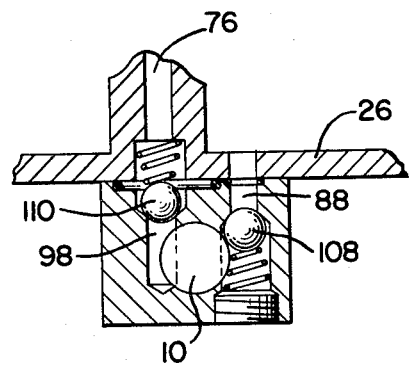
FIG. 6 is a cross-section on line 6—6 of FIG. 5.

The pump 79 includes a plunger 102 reciprocable in a bore 104 and biased in one direction by a spring 106. Also, and as shown in FIGS. 5 and 6, the port 88 communicates as a sump inlet to the bore 104 past a check valve 108 preventing reverse flow of oil from the bore 104 to the sump. In like fashion, the port 98 communicates with the bore 100 but by way of a check valve preventing oil flow from the sump to the bore, or as a pump outlet port. In light of this organization, it will be appreciated that reciprocation of the plunger in the bore 104, assuming the latter to be closed except for the ports 88 and 98, will operate to draw oil in through the port 88 and discharge it through the port 98 into the passageway 76 to the annular chamber 70.

The plunger 102 carries a central push rod 112 which extends through the end of the bore 104 to engage a reliefdumping valve in the form of a ball 114 biased into seating engagement over the end of a bore 116 establishing fluid communication between the ports 90 and 96. A spring 117, which in practice will be a relatively heavy spring, acts to seat the ball 114 in a direction opposing passage of oil from the port 96 to port 90 against the control fluid pressure in the annular chamber 70. In light of this organization, it will be seen that when the plunger 102 is reciprocated in the bore 104 such that the rod 112 does not forcibly unseat the ball 114, oil will be pumped through the port 98 to the annular working chamber 70 under a pressure limited to the biasing force exerted by the spring 117 on the ball check 114. If however, the position of plunger reciprocation is moved inwardly of the bore 104 such that the rod 112 engages the ball 114 to unseat it against the bias of the spring 117, then the discharge of the pump through the port 98 will be dumped through the ports 96 and 90 allowing the torque biasing force on the annular chamber 70 to discharge oil therefrom to the sump.

To change the position of plunger reciprocation in the bore 104, the plunger 102 is fitted with a roller 119 biased by the spring 106 into engagement with a ring member 118 circumscribing the support 20 and pivotally mounted from one side by a fixed pin 120. A control link 122 extends through the housing 10 to adjust the pivotal position of the ring 118.

Rotation of the pump 79 with the support 20 relative to the ring 118 will effect reciprocation of the plunger 102 only when the ring is inclined with respect to a plane normal to the axis 14. Moreover, if the ring is inclined by manipulation of the control rod 122 in a direction such that the rod 112 does not engage the ball check 114, the pump will operate to force fluid into the chamber 70 through the port 98. By inclining the ring in the opposite direction, the rod 112 engages the ball 114, allowing fluid to pass from the chamber 70, through the ports 96 and 90. Thus it will be seen that the control rod 122 may be adjusted to render the pump 79 inoperative, or to pump oil to the chamber 70 to rotate the sleeve 52 in one direction, or to allow oil to be discharged from the chamber 70 to the torque bias to rotate the sleeve 52 in an opposite direction.

Because of the fixed journalled relationship of the first and second elements 12 and 16, the sleeve 52 and the support member 20 with respect to the frame 10, and also because the generatrix of the cylindrical rolling surface 46 is linear or straight, variation in the radius R2 of the first element 12 at the contact points P1 and P2 as a result of varying the angle a, with an attendant axial movement of the cone-like members 38 and 40, will require that the external surfaces on the cone-like members 38 and 40 be defined by a curved generatrix establishing a convex axial section. Preferably, the curved generatrix is a circular arc having a radius r shown in FIG. 8.

Figure 7:
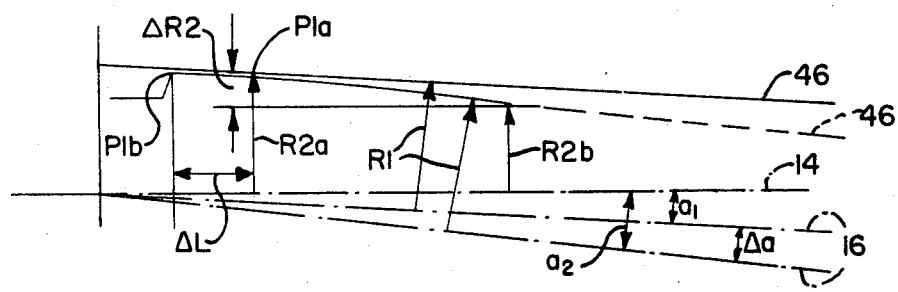
FIG. 7 is a schematic view illustrating the dimensional relationship of components incorporated in the transmission.

As depicted schematically in FIG. 7, as the angle a is changed from $a_1$ to $a_2$ through a differential $\Delta 2$, the radius R2 of the first element 12 which can be accomodated by the cylindrical inner surface of the second element 16 will change from $R2_a$ to $R2_b$ through a differential radius $\Delta R2$ by sliding movement of each of the cone-like members 38 and 40 on the axis 14 through a distance $\Delta L$. If it is assumed that the angles $a_1$ and $a_2$ represent minimum and maximum values of the angle a to be used in the transmission, and correspondingly the angle Δa the maximum variation in the angle a, then the axial distance ΔL will represent the maximum axial movement of the cone-like members 38 and 40 away from the point S.

Figure 8:
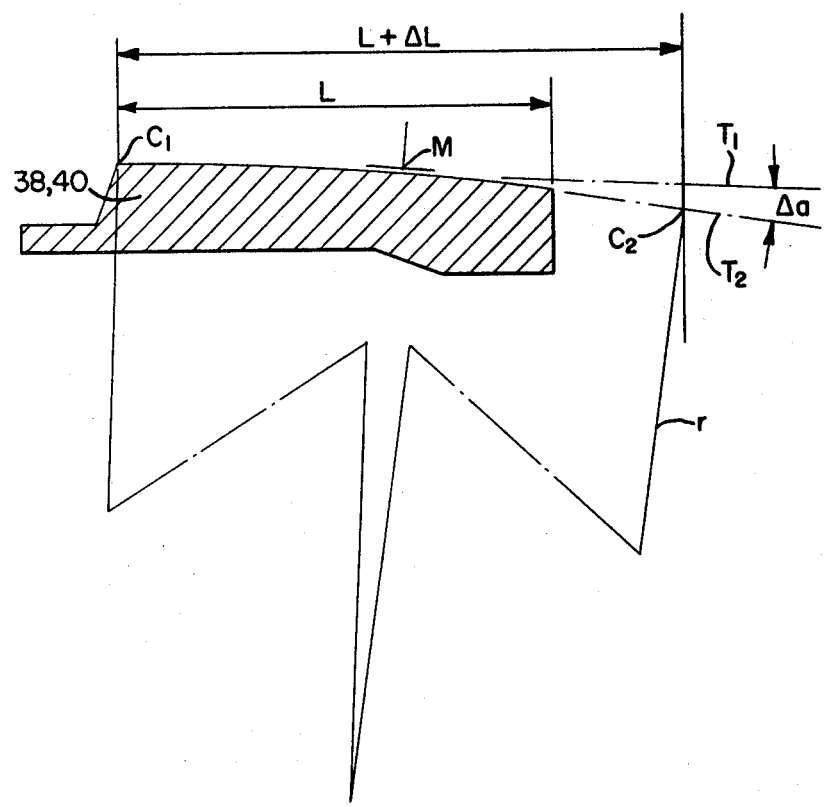
FIG. 8 is a schematic view depicting the radius of a curved generatrix of one of the rolling surfaces incorporated in the transmission of the present invention.

As shown in FIG. 8, the radius r of the curved generatrix of the external surfaces of the cone-like members 38 and 40 is determined by the intersection of lines perpendicular to a pair of tangents $T_1$ and $T_2$ intersecting each other at a point M spaced midway between points $C_1$ and $C_2$ of perpendicular intersection by the radius lines with the respective tangents $T_1$ and $T_2$. The distance between the points $C_1$ and $C_2$ is equal to the sum of the axial length of the exterior surface of the cone-like members 38 or 40 and the distance of axial movement ΔL each of the members 38 and 40 travel with respect to the point of axes intersection S.

It will be understood, therefore, that variations in the angular or rotational relationship of the support member 20 and the eccentric sleeve 52 will change the angle a, causing the members 38 and 40 to move toward or away from the point S either against or under the influence of a mechanical force developed by spring 42 in the disclosed embodiment, for example. Correspondingly, the effective radius of the cone-like members 38 and 40 will be varied as described above with respect to FIG. 7 to change the speed ratio of the transmission continuously over the design range thereof.

It is contemplated that in many applications, the variable speed transmission constituted essentially by the frame 10 or its equivalent, the first and second elements 12 and 16, the support member 20, and the eccentric sleeve 52 may be used by coupling an input torque directly to the support member 20 to drive with variable angular velocities, an output torque load coupled directly to the shaft 32. In the prefered embodiment of the invention illustrated in FIG. 1, however, input torque is supplied from an appropriate source (not shown) to the shaft 30 and a centrifugal clutch generally designated by the reference numeral 124. As shown, the clutch includes an output disc 126 keyed to the sleeve 28 of the support member 20 and adapted to be frictionally engaged on opposite sides by discs 128 carried by a driving member 130. Friction force is developed by hydraulic fluid or oil acting against an annular piston 132. Oil for this purpose is supplied along the interior of the hollow shaft 32 from the port 80 described above and directed to the piston by centrifugal force under the control of a sensor 134. An auxiliary output shaft 136 coupled directly to the clutch input member 130 may be used to drive engine auxiliaries at the same angular velocity as the input member 130. Also, it will be noted that the outside diameter of the shaft 136 is smaller than the inside of the hollow shaft 32 to leave an annulus for the passage of oil.

The output of the transmission is preferably delivered by a shaft 138 coupled to the hollow shaft 32 by a gear-type transmission 140. The gear transmission is arranged to transmit torque from the shaft 32 to the output 138 in first and second "forward" speeds and one "reverse" speed. To this end, pinion gears 142 and 144 are keyed for rotation directly with the hollow shaft 32 and mesh at all times with gears 146 and 148 respectively, the latter two gears being rotatable freely on the output shaft 138. A coupling gear 150 is splined for rotation at all times with the shaft 138 and slidable axially thereon. It will be noted that the gears 146, 148 and 150 have interengaging axial sets of teeth 152 and 154. Thus, when the gear 150 is moved axially into engagement with the gear 146, the output shaft 138 will be coupled with the hollow shaft 32 by way of gears 142 and 146 to effect a "first" speed forward direction of rotation in the shaft 138. When the gear 150 is shifted axially out of engagement with the gear 146 and into engagement with the gear 148 by way of the axial teeth 154, transmission of torque from the shaft 32 to the shaft 138 will be by way of gears 144 and 148 to effect a "second" speed forward direction of rotation in the shaft 138.

A reverse gear is provided by an axially slidable and freely rotatable gear on 156 on the shaft 32. Gear 156 may be coupled to the shaft 32 or decoupled therefrom by axial engagement of teeth 158 with the keyed gear 142. The gear 156 is coupled at all times through a third reversing gear (not shown) with the gear 150 such that when the teeth 158 are engaged, and the gear 150 is positioned centrally between the gears 146 and 148 as shown in FIG. 1, the shaft 138 will be driven in a direction the reverse of that in which the shaft 32 is driven in a direction the reverse of that in which the shaft 32 is driven. Thus it will be appreciated that the range of output speeds in the shaft 32 may be extended by the gear-type transmission 140.

Thus it will be seen that by this invention there is provided an improved transmission by which the above-mentioned objectives are completely fulfilled. Also it will be apparent to those skilled in the art that variations and/or changes in the disclosed embodiment may be made without departure from the inventive concept manifested thereby. Accordingly, it is expressly intended that the foregoing description is illustrative of a preferred embodiment only, not limiting, and that the true spirit and scope of the present invention be determined by reference to the appended claims.

We claim:

1. A torque transmission apparatus comprising:
   a frame;
   a first element including a first shaft supported by said frame for rotation on a first axis and supporting for rotation therewith a pair of axially movable cone-like members having oppositely converging exterior rolling surfaces of revolution defined by curved generatrices to be convex in axial section;
   a second cylindrical element having an internal rolling surface concentric with a second axis intersecting said first axis at a point of axis intersection;
   support means rotatable in said frame on said first axis to support said second element for nutating movement in which said second axis revolves in a conical path about said first axis so that the rolling surfaces of said first and second elements are in rolling frictional engagement at two points in a plane containing said first and second axes and located one on each side of said point of axes intersection;
   eccentric means for adjusting the angle of intersection between first and second axes to shift said two points of rolling frictional engagement in opposite axial directions along said cone-like members thereby to vary the radii of the rolling surfaces on said first element at said two points of rolling frictional engagement;
   means including an externally controlled pump carried by said support means for controlling the angular disposition of said eccentric means with respect to said cylindrical element and said support means to adjust the angle of intersection between said first and second axes;

clutch means having a driving member adapted to be connected with a source of driving torque and a driven member adapted to be keyed for rotation directly with said support means on one end thereof, and means for releasably engaging said driving and driven members;

a rotatable output shaft spaced from and parallel to said first shaft; and a shiftable gear-type transmission for coupling said output shaft to said first shaft.

2. The apparatus recited in claim 1, wherein said shiftable gear-type transmission comprises first and second gears keyed for rotation with said first element, and fourth gears freely rotatable on said output shaft and meshing respectively with said first and second gears, and axially shiftable means on said output shaft for coupling said first element with said output shaft through either of said first and second gears to establish first and second output speed ranges of said output shaft.

3. The apparatus recited in claim 2, wherein said axially shiftable means comprises a fifth gear adapted to be driven by a sixth gear freely rotatable on said first element to effect reverse rotation of said output shaft.

* * * * *